Feb. 9, 1943.  M. M. ELLMAN  2,310,409
DENTAL BURR AND HAND-PIECE ASSEMBLY
Filed May 7, 1941
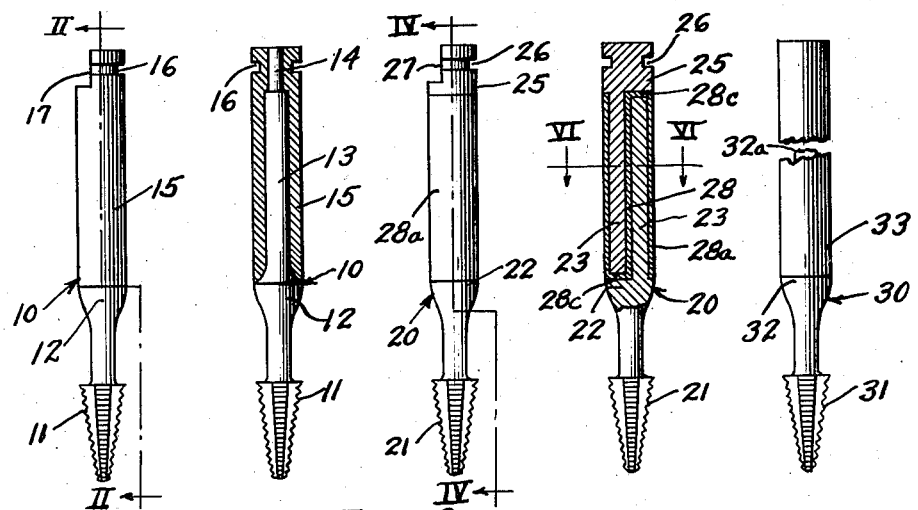
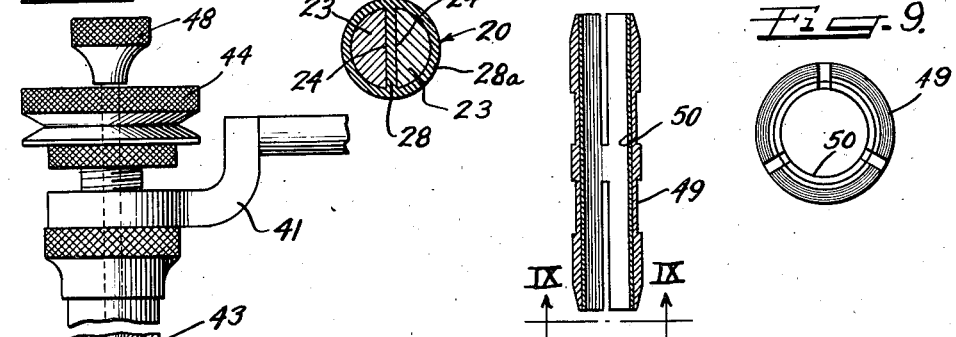
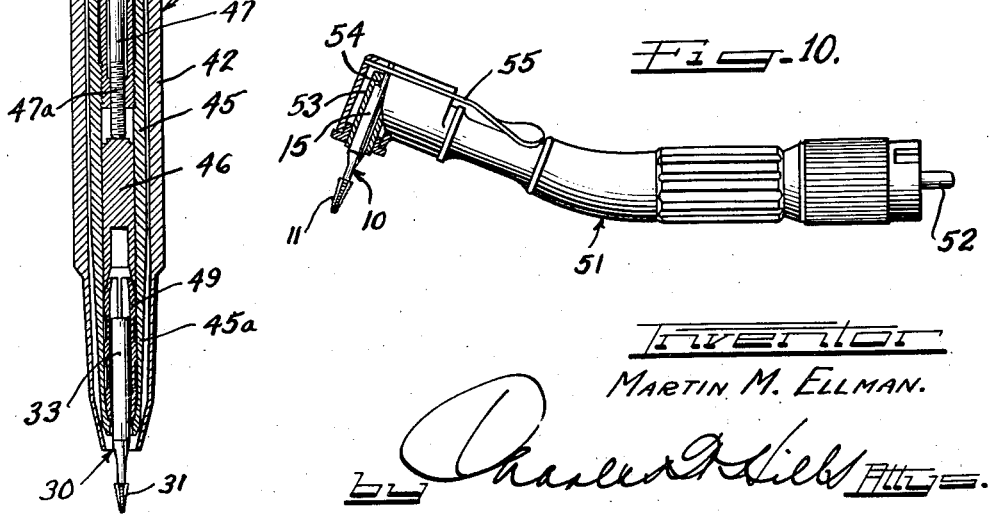
Inventor
Martin M. Ellman.

Patented Feb. 9, 1943

2,310,409

UNITED STATES PATENT OFFICE 2,310,409

DENTAL BURR AND HAND-PIECE ASSEMBLY

Martin M. Ellman, Rockford, Ill.

Application May 7, 1941, Serial No. 392,208

2 Claims. (Cl. 32—58)

This invention relates to dental burrs or burr and dental hand piece assemblies equipped with vibration dampener inserts to reduce shock or vibration, noise, and heating of the tooth or other material acted on by the burr.

Specifically the invention relates to the interposing of a non-metallic vibration dampener insert between a dental burr and the chuck of the dental handpiece.

In the following description the term "burr" will cover dental drills, oral surgery burrs and dental mandrils for the mounting of various dental stones or disks useful in grinding and polishing.

Shock, vibration and noise in the drilling of a tooth originate in the cutting portion of a burr when it is in operation and held against the tooth. This vibratory action and uncomfortable feeling is caused by the impact of the numerous serrated or convex surfaces of the burr as they rotate against the tooth. Heretofore these vibrations were transmitted successively through the centra-angle piece if one were used, the straight handpiece, and finally the long arm of the dental unit. As a result, the vibrating surfaces were considerably increased, thereby producing a large vibrating mass.

The large vibrating mass increases the impact shock against the tooth causing discomfort to the patient. Since a large mass is caused to vibrate the noise of vibration is increased, adding to the nervous strain of the patient.

In accordance with the present invention, a non-metallic vibration dampener insert is interposed between the dental burr and the dental unit, such as the contra-angle handpiece or the straight handpiece. This insert absorbs the vibration, and as a result the vibrating surface is considerably reduced because a major portion of the vibration cannot filter past the insert.

According to this invention either the shank of the dental burr or the chuck of the handpiece can be covered with the vibration dampener material. Non-metallic substances such as rubber, Bakelite, acrylic resins and other plastics, wood, or the like, are satisfactory. These materials, because of their relative elasticity, filter out the transmission of vibration to the handpiece, reduce a certain amount of the shock of the burr against the tooth by decreasing the impact pressures, and lessen the frictional heating of the tooth. Likewise since the non-metallic vibration dampener inserts are poor heat conductors, heating of the handpiece during operation does not effect heating of the burr. In ordinary practice, the heating of the contra-angle handpiece will add to the temperature of the burr.

It is then an object of this invention to provide means for reducing shock, vibration, and heating of a tooth during a drilling operation.

A further object of this invention is to provide vibration dampener inserts between the head of a dental burr and the dental unit driving the burr.

A specific object of this invention is to provide dental burrs with non-metallic vibration dampening material to absorb vibratory action of the burr head in operation.

Another object of the invention is to reduce the shock or vibration of dental burrs by covering the shanks thereof with non-metallic vibration dampener material such as rubber, plastic, wood or the like, or with soft metal dampener material such as lead.

A specific object of the invention is to provide a dental burr with a vibration dampening sleeve around the shank thereof.

Another specific object of the invention is to line the chuck of a dental handpiece with vibration dampening material.

Other and further objects of the invention will be apparent to those skilled in the art from the following detailed description of the annexed sheet of drawings which, by way of example, illustrates preferred embodiments of the invention. It will be understood, however, that the invention is not limited to illustrated preferred embodiments.

On the drawing:

Figure 1 is an elevational view of a dental burr according to this invention especially adapted for use in contra-angle handpieces.

Figure 2 is a cross-sectional view, with parts in elevation, taken along the line II—II of Figure 1.

Figure 3 is an elevational view of another form of dental burr according to this invention especially adapted for use in contra-angle handpieces.

Figure 4 is a cross-sectional view, with parts in elevation, taken along the line IV—IV of Figure 3.

Figure 5 is a broken elevational view of a dental burr according to this invention especially adapted for use in straight handpieces.

Figure 6 is an enlarged horizontal cross-sectional view taken along the line VI—VI of Figure 4.

Figure 7 is an elevational view, with parts broken away and with parts shown in vertical cross-section, of a straight dental handpiece illustrating the manner in which the burr of Figure 5 is mounted therein.

Figure 8 is an enlarged vertical cross-sectional view of the chuck of a straight dental handpiece lined with vibration dampening material in accordance with this invention.

Figure 9 is an end view of the chuck taken along the line IX—IX of Figure 8.

Figure 10 is an elevational view of a contra-angle dental handpiece with a part broken away and shown in vertical cross-section to illustrate the mounting of a burr such as shown in Figures 1 and 4 therein.

As shown on the drawings:

In Figures 1 and 2 the reference numeral 10 designates generally a drill or dental burr adapted for mounting in a contra-angle handpiece. The burr has a serrated cutting head 11 and a shank 12 extending therefrom. In accordance with this invention, the upper end of the shank 12 which is to be mounted in the handpiece is reduced in diameter as at 13 and further reduced at the extremity thereof as at 14. A sleeve 15 of non-metallic vibration dampening material such, for example, as vulcanized rubber, molded plastic material, or the like, surrounds the reduced shank portions 13 and 14 to cover the same. The sleeve 15 has an outer diameter the same as the normal diameter of the shank 12. The sleeve 15 has an annular groove 16 therein near the free end thereof and also has a flat recessed portion 17. The groove 16 and the recessed portion 17 provide for the mounting of the burr in a contra-angle handpiece.

In Figures 3, 4 and 6, the reference numeral 20 designates generally a modified form of dental burr in accordance with this invention. The burr 20 has a serrated cutting head 21 and a cylindrical shank 22 extending therefrom. In accordance with this invention, the shank 22 is formed in two parts each including a reduced, segmental cylindrical finger 23 having a flat face 24 along the length thereof. The finger 23 of the shank portion carrying the burr head 21 terminates short of the end of the burr shank. Likewise, the finger 23 on the other shank portion terminates short of the burr head. This other portion has a cylindrical end 25 overlapping the other finger 23 and is equipped with an annular groove 26 and a recessed portion 27.

The fingers 23 are mounted with their flat faces 24 in opposed relation as best shown in Figure 6 and are bonded together by means of non-metallic vibration dampening material 28 such as vulcanized rubber, molded plastics or the like. The bonding material 28 also surrounds the fingers 23 to provide a sleeve 28a forming the exterior surface of the finished burr shank which extends from the lower end of the shank to the head 25. The bonding material 28 also extends over and under the ends of the fingers 23 as at 28c in Figure 4.

The resulting assembly therefore is composed of a metal burr head portion with a reduced longitudinally extending finger and a shank head portion with a similar reduced longitudinally extending finger. The fingers provide half-lap tabs and a non-metallic bonding material having vibration dampening properties unites the fingers to integrally join the burr head portion with the shank head portion while holding the portions in non-contacting relation. At the same time, the bonding material forms an enveloping sleeve along a major portion of the resulting shank of the burr.

As a result, vibration of the burr head 21 can only be imparted to the metal which is integral with the head and is then dampened out by the bonding material 28 from transmission to the head 25. The sleeve 28a filters out the vibration through the contra-angle hand piece in which the burr may be mounted.

In the modification shown in Figure 5 the burr 30 has the usual serrated metal head 31 and the longitudinally extending metal shank portion 32. However, in accordance with this invention the shank 32 is reduced in diameter as at 32a, and is covered with a sleeve 33 of vibration dampening material such as vulcanized rubber, molded plastics or the like. The burr 30 has a cylindrical shank 32 which is somewhat longer than the shanks of the burrs shown in Figures 1 to 4 since the burr 30 is primarily adapted for mounting in a straight dental handpiece. The end of the shank, therefore, is not equipped with an annular groove or flat spot.

As shown in Figure 7, reference numeral 40 designates generally a straight dental handpiece of standard construction and mounted on swinging arm 41 of a dental unit. The handpiece 40 includes a tubular casing 42, a hollow body member 43 rotatably mounted in the casing 42 and projecting through the supporting arm 41 for receiving driving pulley 44 thereon. The driving unit is driven by the cord of the dental unit (not shown).

The body member 43 has a hollow tubular member 45 threaded thereon inside of the casing 42. The member 45 has a tapered end 45a. A wedge 46 is slidably mounted in the upper end of the member 45 and is adapted to be urged toward the tapered end 45a thereof by means of a pin 47 which extends through the body member 43 and is threaded through the end thereof as at 41a. The pin 47 projects through the body member above the pulley 44 and has a knurled knob 48 secured thereon for manual adjustment of the pin in its threaded seat.

The wedge member 46 acts upon a tubular chuck 49 mounted in the tapered end 45a of the member 45. The chuck 49 has slit tapered ends to be flexed inwardly by the tapered end of the wedge 46 and by the tapered portion 45a of the member 45. A burr such as the burr 30 has the sleeve covered shank portion 32a thereof inserted in the chuck 49 and the knob 48 is then turned to rotate the pin 47 for forcing the wedge 46 against the chuck thereby contracting the slit ends thereof and firmly holding the burr in the handpiece. Since the sleeve 33 of the burr is the only portion thereof which contacts any part of the handpiece, and since this sleeve is composed of non-metallic vibration dampening material, the vibration of the burr during the drilling of a tooth is not transmitted through the chuck to the dental unit.

This dampening or filtering out of vibration reduces shock and noise as explained above. The possible vibrating surface is greatly reduced and vibrations of the magnitude heretofore encountered are eliminated.

In accordance with a further modification of this invention the chuck 49 of the handpiece 40 can be lined with vibration dampening material as shown in Figures 8 and 9. As therein shown, a lining 50 is bonded to the interior of the chuck 49. This lining can be composed of any suitable vibration dampening material capable of flexing with the metal of the chuck. The liner 50 can be used for direct engagement with regulation metal shanks of dental burrs or with sleeve covered shanks such as are shown in Figures 1 to 5.

As shown in Figure 10, the reference numeral 51 designates a contra-angle handpiece adapted to be mounted on the end of the straight handpiece 40. The contra-angle member has a drive shaft 52 projecting from the end thereof adapted to be engaged by the chuck 49 of the straight handpiece. A bevel gear (not shown) is provided at the other end of the drive shaft for rotating a hollow receiving member or chuck for the contra-angle dental burr. This receiving member has a flat shoulder 54 at the upper end thereof adapted to engage the flat spot on the contra-angle type burr. A retainer 55 is pivotally mounted on the contra-angle piece 51 for swinging into and out of engagement with the groove provided on contra-angle type burrs as pointed out above.

As shown in Figure 10, the burr 10 has the shank thereof mounted in the housing 53, and the sleeve 15 around the shank is the only portion of the burr which contacts the contra-angle piece. As a result, vibration of the burr head 11 is dampened or filtered out to produce the results described above. Alternatively, the chuck or housing 53 can be lined with vibration dampening material.

From the above description, it will therefore be understood that this invention now provides for the insulation of metal burrs from metal to metal contact with a dental handpiece so that vibration of the burr head cannot be transmitted to the dental unit to the extent heretofore encountered. The invention provides for the dampening out of vibration either by lining the chuck of the dental handpiece with vibration dampening material or by covering the shank of the dental burr with such material, or both.

It will, of course, be understood that various details of construction may be varied through a wide range without departing from the principles of this invention and it is, therefore, not the purpose to limit the patent granted hereon otherwise than necessitated by the scope of the appended claims. For example while non-metallic dampener inserts are preferred, soft metal inserts such as lead could be used. Further, the specific illustrated burr heads are exemplary only since any type or shape of burr head can be used with the invention.

I claim as my invention:

1. A dental burr having a split half-lapped shank portion and a molded plastic separating member for said split shank position, said separating member having an outer wall embracing the lapped portions of said shank, a longitudinally extending wall within said outer wall and interposed between the opposed lapping surfaces of said split shank, and end walls between said longitudinally extending wall and the outer wall, said end walls being at opposite ends of said separating member and interposed between adjacent end walls of said split shank portions.

2. A split dental burr shank having sections provided with interlocking cooperating opposed surfaces of stepped formation conforming to the configuration of one another, said shank sections having a peripheral recess coextensive with the split portion of said shank, and a plastic locking member having a wall seated in said peripheral recess and other walls interposed between said cooperating opposed surfaces whereby said sections are locked together for co-rotation and cushioned against each other.

MARTIN M. ELLMAN.